Patented Dec. 21, 1926.

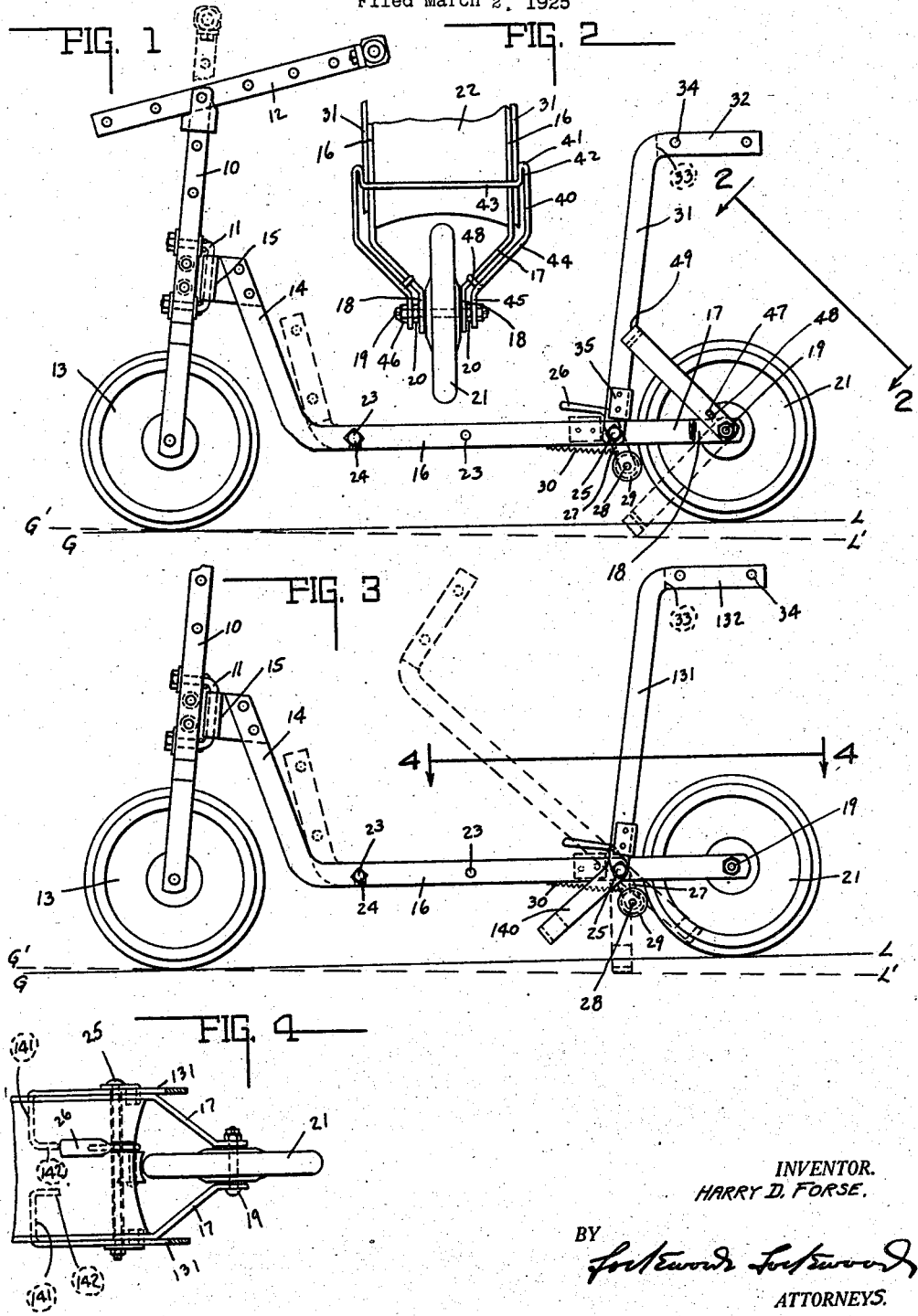

1,611,307

UNITED STATES PATENT OFFICE.

HARRY D. FORSE, OF ANDERSON, INDIANA.

COMBINATION SEAT AND VEHICLE STAND.

Application filed March 2, 1925. Serial No. 12,731.

This invention relates to juvenile vehicles of a scooter type which is provided with a seat construction and a foot board or platform.

The chief object of the invention is not only to provide a scooter of the character described with a stand for supporting the same against toppling or rolling movement, but to cooperatingly associate the seat with said stand, the seat being pivotally supported.

The chief feature of the invention consists in the provision of a tiltably supported seat in a juvenile vehicle of the character described which is associated with a stand construction, and as a further feature of the invention said tiltably supported seat is movable into a position where it serves as a dash for the vehicle.

The full nature of the invention will be understood from the accompanying drawings and the following description and claims:

In the drawings, Fig. 1 is a side elevational view of the invention with the seat in the seat forming position and the stand in the stand inoperative but seat cooperative position, dotted lines indicating other positions of the seat and stand, the dotted ground line having reference to a second position of the latter. Fig. 2 is a view taken in the plane of 2—2 indicated by the arrows in Fig. 1. Fig. 3 is a view similar to Fig. 1 and of a modified form of the invention. Fig. 4 is a view taken on line 4—4 of Fig. 3 and in the direction of the arrows.

In the drawings 10 indicates a fork including a pivot 11 and supported by said fork is a handle 12 and a front wheel 13. A gooseneck arrangement 14 is formed by a pair of straps and the upper end 15 of said construction is associated with a pivotal support for pivotally supporting the fork. The side straps 14 have elongated portions 16 which extend approximately horizontal and in a plane including the axis of the front wheel, although they may be positioned above or below said plane or may be inclined thereto as desired. The rear ends of said side members 16 are bent angularly as at 17 and inwardly towards each other and terminate in parallel portions 18 which support an axle 19. The nuts 20 secure the aforesaid side members 18 and the rear wheel 21 in the desired relationship. Interposed between the side members 16 and maintaining the same in spaced relation is a platform 22. Extending through or into said platform are the securing members 23 for anchoring the platform to the side members. These may consist of bolts or may consist of nails and the like. A slot 24, provided in the under-face of the platform, receives the bolt 23 and thus limits downward movement of the platform through the side members 18. A similar arrangement mounts the rear securing bolt specifically designated by the numeral 25, which supports a lever member having a foot engageable portion 26 and the depending wheel supporting portion 27 which pivotally supports at 28 a roller 29 movable into engagement with the rear wheel for braking. A spring 30 normally maintains the brake construction in the non-braking position. The platform is suitably slotted to receive the brake lever construction.

Pivotally supported, and herein at each side of the side members 16 and by the bolt 25, is a pair of straps 31 which have angular free ends 32 secured together by a seat 33 which extends across the same and maintains said members 31 in spaced relation, said seat being secured to the angular ends by suitable means 34. One or both of the straps 31 near the pivotal support is provided with an angular stop 35, said stop as shown clearly by the full line in Fig. 1, being adapted to engage the side members 16 and limit rearward tilting movement of the seat construction. When the seat construction is tilted forwardly as shown by the dotted line in Fig. 1, then the angular portion of the angle plate 35 engages the side members on the opposite side of the pivot and limits the downward movement of said side members. This prevents the front edge of the seat from contacting the forward edge of the platform when the seat is in the dash forming position, and thus prevents splintering thereof. If desired, this arrangement may be omitted and the dash may bear directly on the platform when in the dash forming position. It will be readily apparent from the foregoing that no matter in which position the seat and side members are arranged, that is either in the dash or seat forming positions, the brake lever 26 is accessible.

Pivotally supported on the axle 19 is a stand construction. Herein the stand construction includes substantially vertical side members 40 having lateral portions 41 and upturned portions 42 connected by the transverse portion 43. The side members 40 are provided with inturned ends 44 terminating in parallel portion 45, receivable by the axle and bearing upon the nuts 20. The stand thus formed is pivotally supported on the axle and may be retained thereon as by the nuts 46. The stand at each side is slotted as at 47 and the cut out portion is turned inwardly as at 48 to form a stop. This stop is adapted to limit forward and downward movement above the platform and forward and upward movement beneath the platform, the former being shown by the full lines in Fig. 1, and the latter by the dotted line in Fig. 1. Herein the seat or side supports 31 therefor are shown notched as at 49 and said notched portions are adapted to receive the transverse connecting portion 43, and thus serve to further support the seat in the seat forming position, thereby not entirely depending upon the stop 35, and in fact stop 35 may be omitted entirely with this construction, since as heretofore indicated its function to limit the downward movement when in the dash forming position may be omitted, and therefore, since both functions are taken care of, the bracket 35 may be entirely omitted. It will be readily apparent that the projection 48 formed from the strap, is a mechanical expedient for substitute abutment constructions which are the equivalent thereof.

In Figs. 3 and 4 there is illustrated a modified form of the invention from that disclosed in Figs. 1 and 2, and in this form of the invention, the similar numbers indicate similar parts. In this form of the invention, however, the side members 131 which have the extensions 132 supporting the combination seat and dash 33 secured thereto and in spaced relation by the means 34. Said combination seat and dash construction is pivotally supported by the bolt 25 which as previously indicated, pivotally supports a brake construction. Herein the side members 131 are extended and form side members of a stand. Herein said stand members are indicated by the numeral 140. Said extensions are positioned angularly of the side members as shown by the full lines in Fig. 3. Each free end of the angular extension 140 terminates in a lateral or transverse portion 141 and an inturned portion 142. The portions 142, however, are not connected by a transverse portion because the same would interfere by engaging with the wheel. The stand construction thus formed, it will be readily apparent, is adapted to straddle the wheel just as the previous stand construction is adapted to straddle the wheel. As shown by the dotted lines in Fig. 3, when the combination seat and dash is either in the dash or seat forming position, the stand construction is inoperative as a stand, but when the seat is moved into an intermediate position the stand portion will be projected into stand forming position and thus support the vehicle in non-toppling and non-moving relation and the seat in an intermediate position. When in either of the extreme positions the stand is inoperative as shown.

While the invention has been described in great detail in the foregoing specification, the same is to be considered as illustrative and not restrictive in character for the two modifications of the invention disclosed herein are not the only ones that may be utilized, but all these modifications, including those which will readily suggest themselves to persons skilled in the art, are all considered to be within the purview of the appended claims, each of which read upon both of the modifications disclose herein.

The invention claimed is:

1. In a juvenile vehicle of the character described the combination of a platform, a wheel supporting said platform, a seat pivoted supported above the platform and pivoted upon an axis parallel to the wheel axis, and seat cooperating stand means pivotally supported upon the axis parallel to one of said axes and coincident with the other axis and movable into stand functioning position for elevating the wheel from its support.

2. In a juvenile vehicle of the character described, the combination of a platform, a wheel supporting said platform, a pivotally supported seat, a similarly supported seat cooperating stand construction including a pair of side members having inturned and upwardly turned portions for vehicle supporting purposes.

3. A device of the character described in the preceding claim characterized by a supporting relationship between the seat and the stand construction in a predetermined position of the seat.

4. A device of the character described in claim 1 characterized by the positioning of the seat adjacent the platform for forming a dash, said stand construction being normally inoperable for directly supporting said seat when the seat is in the dash forming position.

5. A device of the character described in claim 2 characterized by a supporting relationship between the seat and the stand construction in a predetermined position of the seat, said seat being movable into dash forming position adjacent the platform and said seat being normally inoperable for directly supporting said seat when the seat is in the dash forming position.

6. In a juvenile vehicle of the character described the combintion of a plaform, a wheel seat pivotally supporting the same supported above and by a platform, and a stand pivotally supported by the platform and movable into position to support the seat in a predetermined position.

7. A device of the character described in claim 6 characterized by the positioning of the seat adjacent the plaform for forming a dash, said stand construction being normally inoperable for directly supporting said seat when the seat is in the dash forming position.

In witness whereof, I have hereunto affixed my signature.

HARRY D. FORSE.